United States Patent
Hongo

(10) Patent No.: US 8,742,014 B2
(45) Date of Patent: Jun. 3, 2014

(54) LIQUID RESIN COMPOSITION AND CURED PRODUCT USING THE LIQUID RESIN COMPOSITION

(75) Inventor: Shinya Hongo, Akashi (JP)

(73) Assignee: Kaneka Corporation, Osaka (JP)

( * ) Notice: Subject to any disclaimer, the term of this patent is extended or adjusted under 35 U.S.C. 154(b) by 314 days.

(21) Appl. No.: 12/733,611

(22) PCT Filed: Sep. 9, 2008

(86) PCT No.: PCT/JP2008/066232
§ 371 (c)(1),
(2), (4) Date: Mar. 11, 2010

(87) PCT Pub. No.: WO2009/034966
PCT Pub. Date: Mar. 19, 2009

(65) Prior Publication Data
US 2010/0204404 A1    Aug. 12, 2010

(30) Foreign Application Priority Data
Sep. 11, 2007 (JP) .................................. 2007-235851

(51) Int. Cl.
*C08L 33/08* (2006.01)
*C08L 33/10* (2006.01)
*C08L 61/10* (2006.01)
*C08L 63/00* (2006.01)
*C08L 63/02* (2006.01)
*C08L 63/10* (2006.01)
*C08L 67/06* (2006.01)
*C08L 101/06* (2006.01)

(52) U.S. Cl.
USPC ................. 525/65; 525/64; 525/66; 525/68; 525/84; 525/85

(58) Field of Classification Search
None
See application file for complete search history.

(56) References Cited

U.S. PATENT DOCUMENTS

| | | | | |
|---|---|---|---|---|
| 3,787,522 A * | 1/1974 | Dickie et al. | ................. | 428/407 |
| 5,206,299 A * | 4/1993 | Oshima et al. | ................ | 525/305 |
| 5,221,713 A | 6/1993 | Kempner et al. | | |
| 5,273,824 A | 12/1993 | Hoshino et al. | | |
| 5,346,954 A * | 9/1994 | Wu et al. | ......................... | 525/85 |
| 6,509,414 B2 * | 1/2003 | Tikart et al. | .................... | 525/115 |
| 7,291,394 B2 | 11/2007 | Winkler et al. | | |
| 2005/0228072 A1 | 10/2005 | Winkler et al. | | |
| 2006/0292344 A1 | 12/2006 | Winkler et al. | | |
| 2007/0027233 A1 | 2/2007 | Yamaguchi et al. | | |
| 2009/0030132 A1* | 1/2009 | Kumazawa et al. | .......... | 524/493 |

FOREIGN PATENT DOCUMENTS

| | | |
|---|---|---|
| CN | 1871296 | 11/2006 |
| EP | 0 441 559 A2 | 8/1991 |
| EP | 0 526 895 | 2/1993 |
| EP | 0 536 935 A1 | 4/1993 |
| EP | 1 469 020 A1 | 10/2004 |
| EP | 1 698 663 | 9/2006 |
| JP | 59-49259 A * | 3/1984 |
| JP | 05-125257 | 5/1993 |
| JP | 2003/128873 | 5/2003 |
| JP | 2005/533879 | 11/2005 |
| JP | 2007/504307 | 3/2007 |
| JP | 2008-189860 A * | 8/2008 |
| WO | 03/106557 | 12/2003 |
| WO | 2004/108825 | 12/2004 |
| WO | 2005/028396 | 3/2005 |
| WO | 2005/028546 | 3/2005 |
| WO | WO 2006/056758 A2 * | 6/2006 |
| WO | 2006/070664 | 7/2006 |
| WO | WO 2007/007435 A1 * | 1/2007 |
| WO | 2008/105189 | 9/2008 |

* cited by examiner

*Primary Examiner* — Robert Sellers
(74) *Attorney, Agent, or Firm* — Wenderoth, Lind & Ponack, L.L.P.

(57) ABSTRACT

An object of the invention is to provide a liquid resin composition with low viscosity while containing polymer particles. Further, another object of the invention is to provide a liquid resin composition containing a large quantity of polymer particles without increasing the viscosity of the liquid resin composition. A liquid resin composition of the invention is comprising a liquid resin component and polymer particles each having an elastic core layer, an intermediate layer formed with a monomer having two or more double bonds and coated on the core layer, and a shell layer coated on the intermediate layer; wherein the polymer particles are dispersed at a ratio of their volume average particle diameter (Mv) to their number average particle diameter (Mn) of 3 or lower.

9 Claims, No Drawings

LIQUID RESIN COMPOSITION AND CURED PRODUCT USING THE LIQUID RESIN COMPOSITION

TECHNICAL FIELD

The invention relates to a liquid resin composition with low viscosity and containing dispersed polymer particles (more particularly, core-shell polymer particles each having an intermediate layer between a core layer and a shell layer) and a cured product obtained from the liquid resin composition.

BACKGROUND ART

Being excellent in heat resistance, mechanical strength, or size precision, a curable resin represented by a phenol resin, an unsaturated polyester resin, or an epoxy resin has been used widely in various fields. On the other hand, a molded product obtained from a curable resin such as an epoxy resin has a problem that it shows a very fragile characteristic because of low fracture toughness.

To solve the above-mentioned problem, so far, techniques of dispersing polymer particles with a core-shell structure in a curable resin such as an epoxy resin have been disclosed (e.g., refer to WO2004/108825). Disclosed in these documents is a production method of an epoxy resin composition obtained by dispersing rubber-like polymer particles (B) in an epoxy resin (A), which is characterized in that an organic solvent (C) showing partial solubility in water is brought into contact with an aqueous latex of the rubber-like polymer particles (B) and thereafter an organic solvent (D) showing less partial solubility in water than the solvent (C) is further brought into contact with the particles (B) to substantially separate a water layer from the rubber-like polymer particles (B), a dispersion (F) consisting of the obtained rubber-like polymer particles (B) and the mixed organic solvents (C) and (D) are mixed with the epoxy resin (A), and volatile components are removed.

However, since the rubber-like polymer particles (B) are swollen in the epoxy resin composition in the above-mentioned method, the viscosity of the epoxy resin composition becomes high and it sometimes results in deterioration of the workability at the time of producing a molded product. Therefore, to suppress the viscosity of an epoxy resin composition low, the content of the rubber-like polymer particles (B) has to be suppressed.

DISCLOSURE OF THE INVENTION

In view of the above problem, it is an object of the invention to provide a liquid resin composition with low viscosity while containing polymer particles. Further, another object of the invention is to provide a liquid resin composition containing a large quantity of polymer particles without increasing the viscosity of the liquid resin composition.

A liquid resin composition of the invention is comprising: a resin component (A) selected from the group consisting of liquid curable resins, resin solutions of solid curable resins dissolved in a solvent, and liquid organic compounds capable of forming a polymer chain with a curable resin; and polymer particles (B) each having an elastic core layer, an intermediate layer formed with a monomer having two or more double bonds and coated on the core layer, and a shell layer coated on the intermediate layer; wherein the polymer particles (B) are dispersed at a ratio of their volume average particle diameter (Mv) to their number average particle diameter (Mn) of 3 or lower (Mv/Mn≤3).

The polymer particles (B) to be used in the invention are respectively configured to have an intermediate layer between an elastic core layer and a shell layer. The intermediate layer is formed by using a monomer (hereinafter, sometimes referred to as a "monomer for intermediate layer formation") having two or more polymerizable (radical polymerizable) double bonds in a single molecule. Through one of the double bonds, the monomer for intermediate layer formation is graft-polymerized with a polymer forming the elastic core layer to substantially chemically bond the intermediate layer and the shell layer and, at the same time, through the remaining double bond(s), surface of the elastic core layer is crosslinked. Further, since many double bonds are arranged in the elastic core layer, the grafting efficiency of the shell layer is improved.

According to the liquid resin composition of the invention, the crosslinking density of the elastic core layer of the polymer particles contained therein is increased, so that the polymer particles are hardly swollen and thus the viscosity can be suppressed low. As a result, a cured product can be obtained with high workability. Further, since a decrease of the workability at the time of curing (that is, an increase of the viscosity of the liquid resin composition) is prevented and simultaneously the concentration of the polymer particles in the liquid resin composition can be increased, the characteristics of a cured product are more easily improved. Moreover, since the polymer particles to be used in the invention are hardly swollen and an increase of the viscosity of the liquid resin composition can be suppressed low, the liquid resin composition can be used by being mixed with a resin constituent having a high viscosity.

In this specification, the "liquid resin composition" means not only a liquid curable resin composition which can be cured alone but also includes a liquid resin composition to be cured only after being mixed with a liquid or solid (powder) curable resin (monomer).

The intermediate layer is preferably contained at an amount of not smaller than 0.2% by mass and not larger than 7% by mass in 100% by mass of the polymer particles (B). The monomer having two or more double bonds is at least one selected from the group consisting of (meth)acrylate type polyfunctional monomers, isocyanuric acid derivatives, aromatic vinyl type polyfunctional monomers, and aromatic polycarboxylic acid esters. According to the above-mentioned configuration, radical polymerizable double bonds are more sufficiently arranged on the elastic core layer surface. In this specification, the total mass of the monomer for intermediate layer formation composing the intermediate layer is regarded as the mass of the intermediate layer.

The shell layer preferably contains at least one kind of a component having an organic group selected from a hydroxyl group, a carbon-carbon double bond, and an epoxy group. According to the above-mentioned configuration, at the time of curing the liquid resin composition of the invention, the polymer particles (B) are incorporated into a cured product while forming chemical bonds with a resin component or with a solid (powder) curable resin to be mixed with the liquid resin composition. As a result, it is supposed that the polymer particles (B) are hardly driven out from the cured product.

The liquid curable resin is preferably one kind of a resin selected from epoxy resins, oxetane resins, and acrylate resins. The liquid organic compound is preferably an aromatic di(meth)allylic compound(s).

The liquid resin composition of the invention is preferably prepared by a process comprising: a first step of mixing an aqueous latex containing the polymer particles (B) with an organic solvent having a solubility in water of not lower than 5% by mass and not higher than 40% by mass at 20° C., and then further mixing the obtained mixture with an excess amount of water to aggregate the polymer particles (B); a second step of separating and recovering the aggregated polymer particles (B) from a liquid phase, and then mixing again the agglomerated polymer particles (B) with an organic solvent to obtain an organic solvent solution of the polymer particles (B); and a third step of mixing the organic solvent solution with a liquid resin component, and then removing the organic solvent by distillation. According to the above-mentioned configuration, it is made easy to obtain the liquid resin composition in which the polymer particles (B) are dispersed in a state that the volume average particle diameter (Mv)/number average particle diameter (Mn) is 3 or less.

It is preferable that the method further comprises, between the first step and the second step, at least one operation of separating and recovering the aggregated polymer particles (B) from a liquid phase, mixing again the aggregated polymer particles (B) with an organic solvent having a solubility in water of not lower than 5% by mass and not higher than 40% by mass at 20° C., and then further mixing with an excess amount of water to aggregate the polymer particles (B). According to the above-mentioned configuration, water-soluble foreign substances such as an emulsifier contained in the liquid resin composition can be removed to a very large extent.

The invention involves a liquid resin composition comprising a mixture of two or more kinds of the liquid resin compositions.

The invention involves a cured product obtained by curing the liquid resin composition (the mixture).

BEST MODE FOR CARRYING OUT THE INVENTION

A liquid resin composition of the invention contains polymer particles (B) besides a resin component (A). Accordingly, a cured product of the invention obtained by curing the liquid resin composition can be provided with the characteristics (e.g. toughness and heat resistance) derived from the polymer particles (B).

Herein, the polymer particles (B) is composed by coating an elastic core layer with an intermediate layer containing a monomer having two or more polymerizable (radical polymerizable) double bonds and further coating the intermediate layer with a shell layer. Accordingly, since the crosslinking density of the elastic core layer of the polymer particles (B) is increased, even if the polymer particles (B) and the resin component (A) are mixed with each other, swelling does not occur. As a result, an increase of the viscosity of the liquid resin composition can be prevented. Further, since many double bonds are arranged in the elastic core layer, the grafting efficiency of the shell layer can be improved. As a result, the shell layer and the elastic core layer can be more firmly bonded through the intermediate layer.

Furthermore, in the liquid resin composition of the invention, the polymer particles (B) are dispersed in a state of primary particles. Concretely, the polymer particles (B) are dispersed in a state that the volume average particle diameter (Mv)/number average particle diameter (Mn) is 3 or less. Consequently, a significant effect of incorporating the polymer particles (B) into the cured product can be caused efficiently. The liquid resin composition excellent in the dispersibility of the polymer particles (B) can be easily produced by the method to be described later.

The liquid resin composition of the invention is described later in detail.

1. The Resin Component (A)

The resin component (A) to be used in the invention may be selected from liquid curable resins, resin solutions obtained by dissolving solid curable resins in a solvent, and liquid organic compounds capable of forming a polymer chain with a curable resin.

1-1. The Liquid Curable Resin Examples of the liquid curable resins to be used in the invention include reactive polymers (or monomers) having a double bond, a methylol group, a cyclic ether, or a cyanato group and having a melting point (softening point) equal to or lower than room temperature.

Examples of the reactive polymers (or monomers) having a double bond include unsaturated polyester resins, vinylester resins, and acrylate resins. Examples of the reactive polymers (or monomers) having a methylol group include phenol resins. Examples of the reactive polymers (or monomers) having a cyclic ether include epoxy resins, and oxetane resins. Examples of the reactive polymers (or monomers) having a cyanato group include cyanate ester resins. These liquid curable resins may be used alone or in combination.

1-2. The Resin Solutions Obtained by Dissolving a Solid Curable Resins in a Solvent Examples of the solids curable resin to be used in the invention include reactive polymers (or monomers) having the above-mentioned functional groups and having a melting point (softening point) equal to or higher than room temperature.

Further, examples of the solvent to be used for dissolving the solid curable resin include organic solvents usable in a step of obtaining an organic solvent solution of the polymer particles (B) to be described later.

1-3. The Liquid Organic Compounds Capable of Forming a Polymer Chain with a Curable Resin Examples of the liquid organic compounds to be used in the invention include aromatic di(meth)allyl compounds, and (meth)allyl group containing isocyanuric acid derivatives. Examples of the curable resin capable of forming a polymer chain with the liquid organic compound include a bismaleimide resin (compound). Concretely, examples of the liquid organic compound include 4,4'-bisphenol-A diallyl ether, 4,4'-bisphenol-F diallyl ether, 4,4'-bisphenol-A dimethallyl ether, 4,4'-bisphenol-F dimethallyl ether, and tri(meth)allyl isocyanurate. These aromatic di(meth)allyl compounds and (meth)allyl group containing isocyanuric acid derivatives may be used alone or in combination. In this specification, the "(meth)allyl" means allyl and/or methallyl.

1-4. Types of Curing Systems

Examples of the curable resin classified into thermosetting resin include an unsaturated polyester resin, a vinylester resin, an acrylate resin, a phenol resin, an epoxy resin, and a cyanate ester. Examples of the curable resin classified into photo (electron) curable resin include an epoxy resin, an oxetane resin, and an acrylate resin.

In the case of thermally curing the liquid resin composition of the invention, a curing agent may be added to the liquid resin composition. Examples of the curing agent include an amine curing agent such as diaminodiphenyl methane, and diaminodiphenyl sulfone; an acid anhydride such as hexahydrophthalic anhydride; a novolac type phenolic resin, an imidazole compound, a tertiary amine, triphenyl phosphine, an aliphatic polyamine, an aromatic polyamine, a polyamide, a polymercaptan, a dicyan diamide, a diacid dihydrazide, N,N'-dialkyl urea derivatives, N,N'-dialkyl thiourea derivatives, alkylaminophenol, derivatives, melamine, and guanamine. These curing agents may be used alone or in combination.

In the case of photo curing the liquid resin composition of the invention, a photopolymerization initiator may be added to the liquid resin composition. Examples of the photopolymerization initiator include a photo radical polymerization initiator such as benzophenone, benzoin methylether, methyl-O-benzoyl benzoate, benzyldimethyl ketal, 1-hydroxy cyclohexylphenyl ketone, 2-hydroxy-2-methyl-1-phenyl propane, 2-methyl-1-[4-(methylthio) phenyl]-2-morpholino-1-propane, 2,4-diethyl thioxanthone, 2,4,6-trimethylbenzoyl diphenylphosphine oxide; a photo cationic polymerization initiator (photoacid generating agent) such as an onium salt represented by aromatic sulfonium salt and aromatic iodonium salt having anionic site of hexafluoro antimonate, hexafluorophosphate, tetraphenylborate and the like, and metallocene salt. These photopolymerization initiators may be used alone or in combination.

2. The Polymer Particles (B)

The polymer particles (B) to be used in the invention are each composed of, as described above, an elastic core layer, an intermediate layer coating the elastic core layer, and a shell layer further coating the intermediate layer. Formation of the intermediate layer by using a monomer having two or more polymerizable (radical polymerizable) double bonds increases the crosslinking density of the elastic core layer and the grafting efficiency of the shell layer. Hereinafter, the respective layers will be described concretely.

2-1. The Elastic Core Layer

The elastic core layer composing the polymer particles (B) to be used in the invention may have a characteristic as a rubber. To have the characteristic as a rubber, the elastic core layer of the invention has a gel content of preferably 60% by mass or higher, more preferably 80% by mass or higher, furthermore preferably 90% by mass of higher, and particularly preferably 95% by mass or higher. The gel content in this specification means the ratio of the insoluble matter to the total of the insoluble matter and the soluble matter in the case 0.5 g of a crumb obtained by solidification and drying is immersed in 100 g of toluene, the crumb is left still at 23° C. for 24 hours, and thereafter the crumb is separated into the insoluble matter and the soluble matter.

Examples of the polymer having the characteristic as a rubber and capable of forming the elastic core layer include a natural rubber; a rubber elastic body composed of 50% to 100% by mass of at least one kind of a monomer (a first monomer) selected from a diene type monomer (conjugated diene type monomer) and a (meth)acrylate type monomer and 0% to 50% by mass of another co-polymerizable vinyl type monomer (a second monomer); a polysiloxane rubber type elastic body; and combinations thereof. Particularly, in the case the impact resistance of a cured product at a low temperature is to be improved without deteriorating the heat resistance, the elastic core layer is preferably a polysiloxane rubber type elastic body. In this specification, (meth)acrylate means acrylate and/or methacrylate.

Examples of the diene type monomer (conjugated diene type monomer) to be used for forming the elastic core layer include 1,3-butadiene, isoprene, 2-chloro-1,3-butadiene, and 2-methyl-1,3-butadiene. These diene type monomers may be used alone or in combination. Particularly preferred is 1,3-butadiene.

Examples of the (meth)acrylate type monomer to be used for forming the elastic core layer include an alkyl(meth)acrylates such as methyl(meth)acrylate, ethyl(meth)acrylate, butyl(meth)acrylate, 2-ethylhexyl(meth)acrylate, octyl(meth)acrylate, dodecyl(meth)acrylate, stearyl(meth)acrylate, and behenyl(meth)acrylate; an aromatic ring containing (meth)acrylates such as phenoxyethyl(meth)acrylate and benzyl(meth)acrylate; a hydroxyalkyl(meth)acrylates such as 2-hydroxyethyl(meth)acrylate, and 4-hydroxybutyl(meth)acrylate; a glycidyl(meth)acrylates such as glycidyl(meth)acrylate and glycidylalkyl(meth)acrylate; an alkoxyalkyl(meth)acrylates; an allylalkyl(meth)acrylates such as allyl(meth)acrylate, and allylalkyl(meth)acrylate; a polyfunctional (meth)acrylates such as monoethyleneglycol di(meth)acrylate, triethyleneglycol di(meth)acrylate, and tetraethyleneglycol di(meth)acrylate. These (meth)acrylate type monomers may be used alone or in combination. Particularly preferred are ethyl(meth)acrylate, butyl(meth)acrylate, and 2-ethylhexyl(meth)acrylate.

Examples of the vinyl type monomer (a second monomer) copolymerizable with the first monomer include vinylarenes such as styrene, α-methylstyrene, monochlorostyrene, and dichlorostyrene; vinylcalboxylic acids such as acrylic acid, and methacrylic acid; vinylcyans such as acrylonitrile, and methacrylonitrile; vinyl halides such as vinyl chloride, vinyl bromide, and chloroprene; vinyl acetates; alkenes such as ethylene, propylene, butylene, and isobutylene; polyfunctional monomers such as diallylphthalate, triallylcyanurate, triallylisocyanurate, and divinylbenzene. These vinyl type monomers may be used alone or in combination. Particularly preferred is styrene.

Examples of the polysiloxane rubber type elastic body capable of forming the elastic core layer include polysiloxane polymer consisting of at least one alkyl- or aryl-disubstituted silyloxy units such as dimethylsilyloxy units, diethylsilyloxy units, methylphenylsilyloxy units, diphenylsilyloxy units, and dimethylsilyloxy-diphenylsilyloxy units; alkyl- or aryl-monosubstituted silyloxy units such as organohydrogensilyloxy units in which some of alkyl groups in the side chains thereof are substituted with hydrogen atoms. These polysiloxane polymers may be used alone or in combination. Especially, for providing a cured product with heat resistance, polymers composed of dimethylsilyloxy units, methylphenylsilyloxy units, and dimethylsilyloxy-diphenylsilyloxy units are preferable and polymers composed of dimethylsilyloxy units are most preferable since the polymers are easily available and economical.

In the embodiment where the elastic core layer is formed by using the polysiloxane rubber type elastic body, the polysiloxane type polymer portion contains the elastic body preferably at a ratio of 80% by mass or more (more preferably 90% by mass or more) relative to 100% by mass of the entire elastic body, in order not to deteriorate the heat resistance of the cured product.

In the case of using the liquid resin composition of the invention in form of a mixture with a bismaleimide resin (compound), in order not to deteriorate the heat resistance of the bismaleimide resin (compound), the elastic core layer is preferably formed of the polysiloxane rubber type elastic body.

In terms of retention of dispersion stability of the polymer particles (B) to be used in the invention in the liquid resin composition, it is preferable for the elastic core layer that a crosslinked structure is introduced into the polymer component or the polysiloxane type polymer component obtained by polymerization of the above-mentioned monomers. As a method for introducing the crosslinked structure, there may be employed a commonly employed technique. For example, as a method for introducing the crosslinked structure into the polymer component obtained by polymerization of the above-mentioned monomers, there can be mentioned a method of adding a crosslinkable monomer such as a polyfunctional vinyl compound or a mercapto group-containing compound to the polymer component and thereafter carrying out polymerization. Further, as a method for introducing the crosslinked structure into the polysiloxane type polymer, there can be mentioned a method of partially concomitantly using a polyfunctional alkoxysilane compound at the time of polymerization, or a method of introducing a reactive group such as a vinyl reactive group or a mercapto group into the polysiloxane type polymer, and thereafter adding a vinyl-polymerizable monomer or an organic peroxide to cause a radical reaction, or a method of adding a crosslinkable monomer such as a polyfunctional vinyl compound or a mercapto group-containing compound to the polysiloxane type polymer and thereafter carrying out polymerization.

In the invention, the glass transition temperature (hereinafter, sometimes referred to simply as the "Tg") of the elastic core layer is preferably 0° C. or lower and more preferably −10° C. or lower (e.g. −130° C. to −10° C.).

Furthermore, the volume average particle diameter of the elastic core layer is preferably 0.03 µm to 2 µm and more preferably 0.05 µm to 1 µm. It is difficult in many cases to stably obtain the elastic core layer with a volume average particle diameter of smaller than 0.03 µm, and the heat resistance and the impact resistance of a final molded body may possibly become poor if the volume average particle diameter exceeds 2 µm. The volume average particle diameter can be measured by using Microtrack UPA 150 (manufactured by Nikkiso Co., Ltd.).

With respect to the polymer particles (B) of the invention, the elastic core layer preferably contains 40% by mass or more (more preferably 60% by mass or more) of the polymer particles (B) in 100% by mass as a whole to improve the characteristics (e.g. toughness) of the obtained cured product. The upper limit is preferably 95% by mass (more preferably 88% by mass) to keep the good dispersion state of the polymer particles (B) in the liquid resin composition.

In the invention, the elastic core layer often has a monolayer structure; however, the layer may have a multi-layer structure. In the case the elastic core layer has a multi-layer structure, polymer compositions of the respective layers may differ from one another.

2-2. The Intermediate Layer

The intermediate layer composing the polymer particles (B) to be used in the invention is formed by using a monomer (monomer for intermediate layer formation) having two or more polymerizable (radical polymerizable) double bonds in a single molecule.

Examples of the monomer for intermediate layer formation to be used in the invention include a (meth)acrylate polyfunctional monomer such as allyl(meth)acrylate, ethyleneglycol dimethacrylate, and 1,3-butyleneglycol dimethacrylate; dienes such as butadiene, and isoprene; an aromaticvinyl polyfunctional monomer such as divinylbenzene, diisopropenylbenzene, divinylnaphthalene, and divinylanthracene; aromatic polycarboxylic acid esters having two or more polymerizable double bonds such as triallylbenzene tricarboxylate, and diallylphthalate; tertiary amines such as triallylamine; isocyanuric acid derivatives such as diallyl isocyanurate, diallyl-n-propyl isocyanurate, triallyl isocyanurate, trimethallyl isocyanurate, and tris((meth)acryloxyethyl) isocyanurate; cyanuric acid derivatives such as triallylcyanurate; tri(meth)acryloyl hexahydrotriazine; biphenyl derivatives such as 2,2'-dibiphenyl phenyl, 2,4'-divinylbiphenyl, 3,3'-divinylbiphenyl, 4,4'-divinylbiphenyl, 2,4'-di(2-propenyl)biphenyl, 4,4'-di(2-propenyl)biphenyl, 2,2'-divinyl-4-ethyl-4'-propyl biphenyl, 3,5,4'-trivinyl biphenyl. These monomers may be used alone or in combination. Especially, for increasing the crosslinking density of the elastic core layer and the grafting efficiency of the shell layer, preferred are a (meth)acrylate polyfunctional monomer and isocyanuric acid derivatives, specifically preferred are an allyl(meth)acrylate and triallyl isocyanurate. Further, more preferred are isocyanuric acid derivatives (specifically, triallylisocyanurate) for improving the heat resistance of the polymer particles (B).

In the polymer particles (B) of the invention, the content rate of the intermediate layer is preferably 0.2% by mass or more (more preferably 0.5% by mass or more and even more preferably 1.0% by mass or more) and 7% by mass or less (more preferably 5% by mass or less and even more preferably 2% by mass or less) in 100% by mass of the total of the polymer particles (B). If the content rate of the intermediate layer is less than 0.2% by mass, it is sometimes impossible to sufficiently increase the crosslinking density of the elastic core layer or the grafting efficiency of the shell layer. Also, in the case the content rate of the intermediate layer exceeds 7% by mass, the crosslinking density of the elastic core layer becomes high to result in a decrease of the capability as the elastic body and thus it becomes sometimes impossible to sufficiently provide the cured product with the characteristics derived from the polymer particles (B).

2-3. The Shell Layer

The shell layer composing the polymer particles (B) to be used for the invention coats the intermediate layer by causing graft polymerization of a monomer (hereinafter, sometimes referred to as a "monomer for shell layer formation") component to be used for forming the shell layer with the polymer forming the intermediate layer and substantially chemically bonding the shell layer and the intermediate layer together.

Herein, the shell layer is preferably composed by containing at least one kind of a component having an organic group selected from a hydroxyl group, a carbon-carbon double bond, and an epoxy group. Owing to such a configuration, the polymer particles (B) can be participated in the polymerization with the resin component (A) (or the solid (powder) curable resin to be mixed in the liquid resin composition). For example, the polymer particles (B) of which shell layer has hydroxyl groups can be participated in the polymerization of a reactive polymer (monomer) (e.g., a phenol resin) having methylol groups. Further, the polymer particles (B) of which shell layer has carbon-carbon double bonds can be participated in the polymerization of a reactive polymer (monomer) (e.g., an unsaturated polyester resin, an acrylate resin, or a bismaleimide resin (compound)) having double bonds. Moreover, the polymer particles (B) of which shell layer has epoxy groups can be participated in the polymerization of a reactive polymer (monomer) (e.g., an epoxy resin or an oxetane resin) having cyclic ethers.

From the above-mentioned viewpoint, the monomer for shell layer formation is preferably a monomer having a carbon-carbon double bond so as to be graft-polymerized with the polymer forming the intermediate layer and further having at least one organic group selected from a hydroxyl group, a carbon-carbon double bond, and an epoxy group (hereinafter, the monomer is sometimes referred to as a "functional monomer").

Examples of the monomer component having at least one carbon-carbon double bond and at least one hydroxyl group include a hydroxy linear alkyl(meth)acrylate (specifically, hydroxy linear $C_{1-6}$ alkyl(meth)acrylate) such as 2-hydroxyethyl(meth)acrylate, hydroxypropyl(meth)acrylate, 4-hydroxybutyl(meth)acrylate; a caprolactone modified hydroxyl (meth)acrylate; a hydroxy branched alkyl(meth)acrylate such as methyl α-(hydroxymethyl)acrylate, ethyl α-(hydroxymethyl)acrylate; a hydroxyl group containing (meth)acrylates such as polyesterdiol (specifically, saturated polyesterdiol)

mono(meth)acrylate in which the polyesterdiol is obtained from dicarboxylic acid (e.g., phthalic acid) and dialcohol (e.g., propylene glycol).

Examples of the monomer component having two or more carbon-carbon double bonds include allyl(meth)acrylate, ethyleneglycol di(meth)acrylate, diethyleneglycol di(meth)acrylate, triethyleneglycol di(meth)acrylate, tetraethyleneglycol di(meth)acrylate, triallyl isocyanurate, triallylcyanurate, diallylphthalate, divinylbenzene.

Examples of the monomer component having at least one carbon-carbon double bond and at least one epoxy group include glycidyl(meth)acrylate, glycidyl vinylether.

These monomer components may be used alone or in combination.

The shell layer may be formed by containing other monomer components besides the functional monomer component. Examples of other monomer components include (meth)acrylate, an aromatic vinyl compound, a vinyl cyanide compound, a (meth)acrylamide derivative, a maleimide derivative, a vinyl ether, a carboxyl group-containing vinyl monomer. These monomer components may be used alone or in combination.

Examples of (meth)acrylate include an alkyl(meth)acrylate such as methyl(meth)acrylate, ethyl(meth)acrylate, butyl(meth)acrylate, octyl(meth)acrylate, lauryl(meth)acrylate, myristyl(meth)acrylate, stearyl(meth)acrylate, benzyl(meth)acrylate, behenyl(meth)acrylate, and 2-ethylhexyl(meth)acrylate; 2-aminoethyl(meth)acrylate. Examples of the aromatic vinyl compound include styrene; vinylnaphthalene; vinylbiphenyl; an alkyl substituent styrene such as α-methylstyrene; halogen substituent styrenes such as bromostyrene, and chlorostyrene. Examples of the vinyl cyanide compound include (meth)acrylonitrile and a substituted acrylonitrile. Examples of the (meth)acrylamide derivative include a (meth)acrylamide (comprising a N-substituted (meth)acrylamide). Examples of the maleimide derivative include an imidemaleate (comprising a N-substituted imidemaleate). Examples of the vinyl ether include an allylvinylether. Examples of the carboxyl group-containing vinyl monomer include an unsaturated carboxylic acid such as (meth)acrylic acid, crotonic acid, itaconic acid, citraconic acid, maleic acid, fumaric acid, tetrahydrophthalic acid; and anhydride thereof.

The content rate of the functional monomer component in the shell layer is preferably 5% by mass or more (more preferably 10% by mass or more) in the monomer components for shell layer formation. If the content rate of the functional monomer component in the shell layer is less than 5% by mass, the polymer particles (B) may not be sufficiently provided with the function to be participated in the reaction with the resin component (A).

The content rate of the shell layer in the polymer particles (B) of the invention is preferably 5% by mass or more (more preferably 10% by mass or more and even more preferably 12% by mass or more) and 60% by mass or less (more preferably 50% by mass or less and even more preferably 40% by mass or less) in 100% by mass of the whole polymer particles (B). In the case the content rate of the shell layer is less than 5% by mass, the polymer particles (B) tend to be agglomerated at the time of handling and it may sometimes cause a problem in an operation property. Further, physical properties expected for the cured product may not be able to be obtained. Moreover, if the content rate of the shell layer exceeds 60% by mass, the content rate of the elastic core layer in the polymer particles (B) is lowered and accordingly, the effect of improving the toughness for the cured product tends to be lowered.

The total of the content rates of the elastic core layer, the intermediate layer, and the shell layer is 100% by mass.

The graft ratio of the shell layer of the polymer particles (B) to be used in the invention is preferably 70% or higher (more preferably 80% or higher and even more preferably 90% or higher). If the graft ratio is less than 70%, the viscosity of the liquid resin composition may be increased. In this specification, a calculation method of the graft ratio is as follows.

First, the aqueous latex containing the polymer particles (B) is solidified and dewatered and finally dried to obtain a powder of the polymer particles (B). Next, 2 g of the powder of the polymer particles (B) is immersed in 100 g of methyl ethyl ketone (MEK) at 23° C. for 24 hours and thereafter an MEK-soluble matter is separated from an MEK-insoluble matter and further a methanol-insoluble matter is separated from the MEK-soluble matter. Thereafter, the ratio of the MEK-insoluble matter to the total amount of the MEK-insoluble matter and the methanol-insoluble matter is calculated as the graft ratio.

2-4. Particle Diameter of the Polymer Particles (B)

The particle diameter of the polymer particles (B) can be set in a range in which the aqueous latex of the particles can be obtained stably. Further, taking the industrial productivity in consideration, the volume average particle diameter (Mv) is preferably 0.03 μm or larger (more preferably 0.05 μm or larger) and 2 μm or smaller (preferably 1 μm or smaller). The volume average particle diameter (Mv) of the polymer particles (B) can be measured by using Microtrack UPA 150 (manufactured by Nikkiso Co., Ltd.).

2-5. Production Method of the Polymer Particles (B)

2-5-1. Production Method of the Core Layer

In the case a polymer forming the elastic core layer composing the polymer particles (B) to be used in the invention is composed by containing at least one kind of a monomer (first monomer) selected from a diene type monomer (conjugated diene type monomer) and a (meth)acrylate type monomer, formation of the elastic core layer can be carried out by, for example, emulsion polymerization, suspension polymerization, micro-suspension polymerization, or the like and the method disclosed in, for example, WO2005/028546 can be employed.

Further, in the case the polymer forming the elastic core layer is composed by containing a polysiloxane type polymer, formation of the elastic core layer can be carried out by, for example, emulsion polymerization, suspension polymerization, micro-suspension polymerization, or the like and the method disclosed in, for example, WO2006/070664 can be employed.

2-5-2. Formation Method of the Intermediate Layer

The intermediate layer can be formed by polymerizing a monomer for intermediate layer formation by conventionally known radical polymerization in the presence of the elastic core layer (particles). In the case a rubber elastic body composing the elastic core layer is obtained in form of an emulsion, the polymerization of the monomer for intermediate layer formation is preferably carried out by emulsion polymerization.

Examples of an emulsifier (dispersant) to be used for emulsion polymerization include various acids such as an alkyl- or aryl-sulfonic acid represented by dioctylsulfosuccinic acid and dodecylbenzenesulfonic acid, an alkyl- or aryl-ethersulfonic acid, an alkyl- or aryl-sulfuric acid represented by dodecylsulfunic acid, an alkyl- or aryl-ethersulfuric acid, an alkyl- or aryl-substituent phosphoric acid, an alkyl- or aryl-ether substituent phosphoric acid, a N-alkyl- or N-aryl-sarcosine acid represented by dodecylsarcosine acid, an alkyl- or aryl-carboxylic acid represented by oleic acid or stearic acid, and an alkyl- or aryl-ether carboxylic acid; an anionic emulsifier (dispersant) such as an alkali metal salt or an ammonium salt thereof; a nonionic emulsifier (dispersant) such as an alkyl- or aryl-substituent polyethyleneglycol; a polyvinylalcohol; an alkyl substituent cellulose; polyvinylpyrrolidone; a polyacrylic acid derivative. These emulsifiers (dispersants) may be used alone or in combination.

To an extent that the dispersion stability of the aqueous latex of the polymer particles (B) is not adversely affected, the use amount of the emulsifier (dispersant) is preferably small. Further, the emulsifier (dispersant) is more preferable as its water solubility is higher. If the water solubility is high, removal of the emulsifier (dispersant) by water washing becomes easy and an adverse effect on a finally obtained cured product can be easily prevented.

In the case the emulsion polymerization method is employed, a conventionally known initiator, that is, 2,2'-azobisisobutyronitrile, hydrogen peroxide, potassium persulfate, ammonium persulfate, or the like, may be used as a thermal decomposition type initiator.

Further, a redox type initiator may be used in which the redox type initiator is at least one combinations of an organic peroxide such as t-butyl peroxy isopropyl carbonate, paramenthane hydroperoxide, cumene hydroperoxide, dicumylperoxide, t-butyl hydroperoxide, di-t-butyl peroxide, and t-hexylperoxide; an inorganic peroxide such as hydrogen peroxide, potassium persulfate, and ammonium persulfate; and if necessary an reducing agent such as sodium formaldehyde sulfoxylate, and glucose; if necessary a transition metal salt such as ferric sulfate (II); if necessary a chelating agent such as disodium ethylenediamine tetraacetate; if necessary a phosphorus containing compound such as sodium pyrophosphate.

In the case the redox type initiator system is used, polymerization can be carried out even at a low temperature at which the above-mentioned peroxides are not substantially thermally decomposed and the polymerization temperature can be set in a wide range and thus it is preferable. Especially, it is preferable to use organic peroxides such as cumene hydroperoxide, dicumyl peroxide, and t-butyl hydroperoxide as the redox type initiator. The use amount of the initiator and the use amount of the above-mentioned reducing agent, transition metal salt, or chelating agent in the case of using a redox type initiator may be set in conventionally known ranges. Further, in the case of polymerizing a monomer having two or more double bonds, a conventionally known chain transfer agent can be used in a conventionally known range of use. Moreover, a conventionally known surfactant can be used additionally in a conventionally known range of use.

The conditions such as the polymerization temperature, pressure, and deoxidation to be employed upon polymerization may be set in conventionally known ranges. Further, the polymerization of the monomer for intermediate layer formation may be carried out in one stage or in two or more stages. Employable are, for example, a method of adding the monomer for intermediate layer formation at one time to the emulsion of the rubber elastic body composing the elastic core layer and a method of continuously adding the monomer and also a method of adding an emulsion of the rubber elastic body composing the elastic core layer to a reactor which contains the monomer for intermediate layer formation and then carrying out polymerization.

2-5-3. Formation Method of the Shell Layer

The shell layer can be formed by polymerizing a monomer for shell layer formation by conventionally known radical polymerization in the presence of the elastic core layer (particles) coated with the intermediate layer. In the case the elastic core layer (particles) coated with the intermediate layer is obtained in form of an emulsion, it is preferable to carry out the polymerization of the monomer for shell layer formation by an emulsion polymerization method and for example, the production can be carried out by the method disclosed in WO 2005/028546.

3. The Liquid Resin Composition

With respect to the liquid resin composition of the invention, the content of the polymer particles (B) is preferably 1% by mass or more (more preferably 2% by mass or more and even more preferably 3% by mass or more) in the liquid resin composition and preferably 60% by mass or less (more preferably 50% by mass or less and even more preferably 40% by mass or less). In the case the content of the polymer particles (B) is less than 1% by mass, with respect to the cured product of the invention obtained by using the liquid resin composition, the intended effect of improving impact resistance and of improving the toughness cannot be obtained sufficiently in some cases. Further, if the content of the polymer particles (B) exceeds 60% by mass, sufficient dispersibility may not be obtained in some cases.

Since the polymer particles (B) contained in the liquid resin composition of the invention have the above-mentioned intermediate layer, an increase of the viscosity of the liquid resin composition due to the addition of the polymer particles (B) can be suppressed low. A method of measuring the viscosity of the liquid resin composition will be described later.

The polymer particles (B) to be used in the invention are used, as described later, by being mixed with the resin component (A) without being subjected to solidification and drying, so that the polymer particles (B) are dispersed in a state of primary particles in the liquid resin composition. More concretely, the polymer particles (B) are dispersed in a state that the volume average particle diameter (Mv)/number average particle diameter (Mn) is 3 or less (preferably 2.5 or less, more preferably 2 or less, and even more preferably 1.5 or less). With respect to the liquid resin composition containing the polymer particles (B) with the volume average particle diameter (Mv)/number average particle diameter (Mn) exceeding 3, even if the cured product is obtained from the liquid resin composition, it becomes difficult to cause a significant effect (e.g. impact resistance) of addition of the polymer particles (B).

In this specification, the volume average particle diameter (Mv)/number average particle diameter (Mn) is measured, as described later, by respectively measuring the volume average particle diameter (Mv) and the number average particle diameter (Mn) of the polymer particles (B) in the liquid resin composition by using Microtrack UPA (manufactured by Nikkiso Co., Ltd.) and dividing the volume average particle diameter (Mv) by the number average particle diameter (Mn).

Further, the liquid resin composition of the invention may be configured by mixing two or more kinds of the liquid resin compositions of the invention having different dispersion degrees.

4. Preparation Method of the Liquid Resin Composition

The liquid resin composition of the invention is preferably prepared by involving a first step of agglomerating the polymer particles (B) by mixing an aqueous latex containing the polymer particles (B) (more particularly, a reaction mixture after production of the polymer particles (B) by emulsion polymerization) with an organic solvent having a solubility in water of 5% by mass or higher and 40% by mass or lower at 20° C. and further mixing the latex with an excess amount of water; a second step of obtaining an organic solvent solution of the polymer particles (B) by separating and recovering the agglomerated polymer particles (B) from the liquid phase and thereafter, again mixing the polymer particles (B) with an organic solvent; and a third step of mixing this organic solvent solution with the resin component (A) and then removing the organic solvent by distillation. Herein, the ratio of the volume average particle diameter (Mv)/number average particle diameter (Mn) of the polymer particles (B) in the liquid resin composition is preferably not more than 2 times, more preferably not more than 1.8 times, furthermore preferably not more than 1.6 times, and even more preferably not more than 1.4 times to the volume average particle diameter (Mv)/number average particle diameter (Mn) of the polymer particles (B) in the aqueous latex. With such a configuration, the liquid resin composition in which the polymer particles (B) are dispersed in a primary particle state can be easily obtained. Hereinafter, a preparation method of the liquid resin composition will be described more in detail.

4-1. The First Step

The first step involves an operation of mixing an organic solvent having a solubility in water of preferably 5% by mass or higher and 40% by mass or lower (particularly 30% by mass or lower) at 20° C. and an aqueous latex containing polymer particles (B) obtained by emulsion polymerization. Use of such the organic solvent makes it possible to cause phase separation when water is further added after the above-mentioned mixing operation (described later) and to agglomerate the polymer particles (B) in the interface in such a moderate state that re-dispersion is possible.

If the solubility of the organic solvent is less than 5% by mass, the mixing of the organic solvent and the aqueous latex containing the polymer particles (B) sometimes becomes rather difficult. Further, if the solubility exceeds 40% by mass, separation and recovery of the polymer particles (B) from the liquid phase (mainly an aqueous phase) sometimes become difficult in the second step (described later).

Examples of the organic solvent having a solubility in water of 5% by mass or higher and 40% by mass or lower at 20° C. include ketones such as methyl ethyl ketone, esters such as methyl formate, methyl acetate, and ethyl acetate, ethers such as diethyl ether, ethylene glycol diethyl ether, and tetrahydropyrane, acetals such as methylal, and alcohols such as isobutyl alcohol, and sec-butyl alcohol. These organic solvents may be used alone or in combination.

The organic solvent to be used in the first step may be an organic solvent mixture as long as the mixture as a whole shows a solubility in water of 5% by mass or higher and 40% by mass or lower at 20° C. For example, the organic solvent mixture may be a suitable combination of two or more selected from low water-soluble organic solvents and high water-soluble organic solvents; examples of the low water-soluble organic solvent may include ketones such as methylpropylketone, diethylketone, methylisobutylketone, and ethylbutylketone; esters such as diethylcarbonate, butyl formate, propyl acetate, and butyl acetate; ethers such as diisopropyl ether, and dibutyl ether; aliphatic hydrocarbons such as pentane, hexane, heptane, and octane; aromatic hydrocarbons such as benzene, toluene, and xylene; and halogenated hydrocarbons such as methylene chloride, and chloroform; and examples of the high water-soluble organic solvent may include ketones such as acetone, and cyclohexanone; esters such as γ-valerolactone, and ethylenglycol monomethylether acetate; alcohols such as ethanol, isopropylalcohol, and t-butylalcohol; and tetrahydrofuran.

The organic solvent to be used in the first step is preferably one having a specific gravity lower than that of water in terms of easy removal of the liquid phase (mainly an aqueous phase) in the second step described later.

The mixing amount of the organic solvent to be mixed with the aqueous latex is preferably 50 parts by mass or more (particularly 60 parts by mass or more) and 250 parts by mass or less (particularly 150 parts by mass or less) to 100 parts by mass of the aqueous latex. If the mixing amount of the organic solvent is less than 50 parts by mass, it tends to be difficult to produce the agglomerates of the polymer particles (B) contained in the aqueous latex in some cases. Further, if the mixing amount of the organic solvent exceeds 250 parts by mass, the water amount needed for agglomerating the polymer particles (B) thereafter is increased and the production efficiency may be possibly lowered in some cases.

Employable for the above-mentioned mixing operation of the aqueous latex and the organic solvent are conventionally known apparatus. For example, a common apparatus such as a stirring tank equipped with stirring blades may be used, and also a static mixer (a static mixing apparatus) and a line mixer (a system incorporating a stirring apparatus in a part of a pipeline) may be used.

The first step involves an operation of mixing the aqueous latex and the organic solvent and thereafter an operation of further adding and mixing an excess amount of water. Accordingly, phase separation occurs and thus the polymer particles (B) can be agglomerated in a moderate state. Further, most of electrolytes such as a water-soluble emulsifier or dispersant, a polymerization initiator having water solubility, or a reducing agent used at the time of preparing the aqueous latex can be simultaneously eluted to the aqueous phase.

The mixing amount of water is preferably 40 parts by mass or more (particularly 60 parts by mass or more) and 300 parts by mass or less (particularly 250 parts by mass or less) to 100 parts by mass of the organic solvent used at the time of mixing with the aqueous latex. If the mixing amount of water is less than 40 parts by mass, it sometimes becomes difficult to agglomerate the polymer particles (B). Further, if the mixing amount of water exceeds 300 parts by mass, the organic solvent concentration in the agglomerated polymer particles (B) becomes low, so that the dispersibility of the polymer particles (B) can be deteriorated in some cases, that is, it takes a long time to re-disperse the agglomerated polymer particles (B) in the second step described later.

The above-mentioned mixing of water is preferably carried out under stirring or in a fluidizing condition which can give fluidity similar to that by stirring in terms of preventing the polymer particles (B) from being partially un-agglomerated. Concretely, a batch operation or a continuous operation in a stirring tank equipped with a stirrer can be mentioned. Further, the water addition method may be a method of continuous addition or a method of addition at one time.

4-2. The Second Step

The second step involves an operation of separating and recovering the agglomerated polymer particles (B) from the liquid phase to obtain a polymer particle (B) dope. Water-soluble foreign matters such as an emulsifier can be separated and removed from the polymer particles (B) by such an operation.

A method of separating and recovering the agglomerated polymer particles (B) from the liquid phase may be, for example, a method of discharging the liquid phase (mainly an aqueous phase), in the case of using the stirring tank in the first step, from the bottom part of a stirring tank since the agglomerated polymer particles (B) generally have buoyancy to the liquid phase or a method of filtering the liquid phase by using filter paper, a filter fabric or a metal screen with relatively large apertures.

The amount of the organic solvent contained in the agglomerates of the polymer particles (B) is preferably 30% by mass or more (particularly 35% by mass or more) and 75% by mass or less (particularly 70% by mass or less) to the entire mass of the polymer particles (B). If the content of the organic solvent is less than 30% by mass, inconveniences may occur, that is, it may take a long time in the stage of re-dispersing the agglomerates of the polymer particles (B) in an organic solvent in the following step or the agglomerates tend to remain. Further, if the content of the organic solvent exceeds 75% by mass, since a large quantity of the organic solvent is dissolved and remains in water, it sometimes causes agglomeration of the polymer particles (B) in the third step.

In this specification, the amount of the organic solvent contained in the agglomerates of the polymer particles (B) was measured by precisely weighing the agglomerates of the polymer particles (B), drying the agglomerates at 120° C. for 15 minutes and measuring the drying loss.

The second step includes an operation of mixing the agglomerates of the polymer particles (B) with an organic solvent. Since the polymer particles (B) are agglomerated in a moderate state, mixing of them with the organic solvent makes it possible to easily re-disperse the polymer particles (B) in the organic solvent in a state of primary particles.

Examples of the organic solvent to be used in the second step include those exemplified as to the first step. Use of such an organic solvent removes water contained in the polymer particles (B) by azeotropy of the organic solvent with water at the time of removing the organic solvent by distillation in the third step described later. Further, the organic solvent to be used in the second step may be different from the organic solvent used in the first step; however, in terms of reliable re-dispersion of the agglomerates in the second step, the organic solvent is preferably the same kind of organic solvent as that used in the first step.

The mixing amount of the organic solvent to be used in the second step is preferably 40 parts by mass or more (more preferably 200 parts by mass or more) and 1400 parts by mass or less (more preferably 1000 parts by mass or less) to 100 parts by mass of the agglomerates of the polymer particles (B). If the mixing amount of the organic solvent is less than 40 parts by mass, the polymer particles (B) become difficult to be uniformly dispersed in the organic solvent and sometimes the agglomerated polymer particles (B) remain in bulky form or the viscosity is increased to result in difficulty of handling of the polymer particles (B). Further, if the mixing amount of the organic solvent exceeds 1400 parts by mass, a large quantity of energy and a large scale apparatus are required at the time of removal of the organic solvent by distillation in the third step described later and it is uneconomical.

In the invention, it is preferable to carry out, between the first step and the second step, an operation of separating and recovering the agglomerated polymer particles (B) from the liquid phase, mixing the polymer particles (B) again with an organic solvent with a solubility in water of 5% by mass or higher and 40% by mass or lower at 20° C. and thereafter, mixing with an excess amount of water to agglomerate the polymer particles (B) one time or more. Accordingly, the remaining amount of water-soluble foreign matters such as an emulsifier contained in the polymer particle (B) dope can be reduced more.

4-3. The Third Step

The third step includes an operation of replacing the organic solvent in the organic solvent solution of the polymer particles (B) obtained in the second step with the liquid resin component (A). Such an operation uniformly disperses the polymer particles (B) and gives a liquid resin composition with a smaller amount of remaining foreign matters such as an emulsifier. Further, water remaining in the polymer particles (B) can be removed by azeotropic distillation.

The mixing amount of the resin component (A) to be used in the third step may be adjusted properly corresponding to the concentration of the polymer particles (B) in the desired final liquid resin composition.

Conventionally known methods may be employed as a method for replacing the organic solvent with the liquid resin component (A). Examples thereof include a method of loading a tank with a mixture of the organic solvent solution and the resin component (A) and removing the organic solvent by heating and distillation under reduced pressure, a method of counter-flow-contacting a dry gas and the above-mentioned mixture in a tank, a continuous method using a thin film type evaporator, and a method using an extruder equipped with an evaporation mechanism or a continuous stirring tank. The conditions such as the temperature and the required time at the time of removing the organic solvent by distillation may be selected properly to an extent that the quality of the liquid resin composition to be obtained is not deteriorated. Further, the amount of the volatile matter remaining in the liquid resin composition can be selected properly to an extent that there is no problem in terms of the purpose of use of the liquid resin composition.

5. Cured Product

The invention includes a cured product obtained by curing the above mentioned liquid resin composition. With respect to the resin composition of the invention, since the polymer particles (B) are dispersed in a primary particle state, curing of the resin composition easily gives a cured product in which the polymer particles (B) are uniformly dispersed. Further, the polymer particles (B) are hardly swollen and the viscosity of the liquid resin composition is low, so that the cured product is obtained with high workability.

The liquid resin composition of the invention is composed of a liquid organic compound and the polymer particles (B) and in the case that it does not contain a curable resin, the liquid resin composition may be cured after being mixed with a curable resin by a conventional mixing method. Since the liquid resin composition of the invention contains the polymer particles (B) dispersed in the primary particle state, the polymer particles (B) can be uniformly dispersed in the resin composition even if being mixed with the curable resin without carrying out a special dispersion operation and thus the cured product in which the polymer particles (B) are dispersed uniformly can be obtained.

The method of curing of the liquid resin composition of the invention can be selected properly in accordance with the mode of the curable resin and for example, curing can be carried out by a conventional curing method, that is, by a curing agent or catalyst, or the function of heat, light (ultraviolet rays or the like), or a radiation beam (an electron beam or the like), combinations thereof, or the like. Further, the cured product can be obtained from the liquid resin composition of the invention by a conventionally known molding method such as a transfer molding method, an injection molding method, a compressive molding method, a cast molding method, coating and baking, or a stereolithography method.

6. Applications

Applications of the liquid resin composition and its cured product can be exemplified in accordance with the kind of the resin component (A) and examples thereof include, in the case of an unsaturated polyester resin, a binder of a fiber-reinforced plastic (FRP); construction materials for terraces and car ports; housing equipment and materials for bathtub units and septic tanks; transportation equipment such as automobiles, motor boats, and sailboats; electric parts, and the like. Further, a vinyl ester resin can be used for FRP products and resin linings such as tanks and ducts; linings of petroleum tanks; oligomers of solder resist inks; and structural materials of high-speed crafts and pleasure cruisers, and automobiles. Moreover, an acrylate resin can be used for adhesives; coating materials for metals, plastics, and constructions; mortar admixtures, and the like. Furthermore, a phenol resin can be used for electric parts and electronic parts; electric parts in the peripheries of automotive engines; pistons of disk brakes, and the like. Also, a bisphenol A type epoxy resin among epoxy resins can be used for adhesives; coating materials; materials for lamination with glass fibers, and the like. An alicyclic epoxy resin can be used for electric insulation materials and the like. An oxetane resin can be used for display related parts such as antireflection films, antistatic films, hard coats, and color filters; photoresist; three-dimensional structures and the like. A cyanic acid ester resin can be used for heat resistant composite materials for aerospace and the like. In the case a liquid organic compound is used as the resin component (A), by being mixed with a bismaleimide resin (compound), the liquid organic compound can be used for heat resistant composite materials for aerospace and the like.

EXAMPLES

The invention will be described in detail with reference to examples and comparative examples; however, it is not intended that the invention be limited thereto. Modifications can be properly made without departing from the purport mentioned above and later and all of them are included in the technical scope of the invention. In the following examples and comparative examples, "parts" and "%" respectively mean "parts by mass" and "% by mass."

Evaluation Method

First, evaluation methods of liquid resin compositions produced in examples and comparative examples will be described below.

[1] Measurement of Average Particle Diameter and Dispersion Degree

The volume average particle diameter (Mv) and the number average particle diameter (Mn) of polymer particles (B) dispersed in each aqueous latex and liquid resin composition were measured by using Microtrack UPA 150 (manufactured by Nikkiso Co., Ltd.). With respect to each aqueous latex, a sample obtained by dilution with deionized water was used as a measurement sample and with respect to each liquid resin composition, a sample obtained by dilution with methyl ethyl ketone was used as a measurement sample. The measurement was carried out by inputting the refractive indexes of water or methyl ethyl ketone, then inputting the respective refractive indexes of polymer particles, and adjusting the sample concentration in a range of 0.6 to 0.8 for Signal Level at a measurement time of 600 seconds. The dispersion degree was measured by calculating the Mv/Mn using the values of My and Mn.

[2] Measurement of Viscosity

The viscosity of each liquid resin composition was measured by using a digital viscometer DV-II+Pro type manufactured by BROOKFIELD. Which to use between the spindle CPE-41 and CPE-52 was determined depending on the viscosity regions and the viscosity was measured at a Shear Rate of 10 (1/s) at a measurement temperature of 50° C.

1. Formation of Core Layer

Production Example 1-1

Preparation of Polybutadiene Rubber Latex (R-1)

Into a 100 L pressure-resistant polymerization apparatus, 200 parts by mass of deionized water, 0.03 parts by mass of tripotassium phosphate, 0.25 parts by mass of potassium dihydrogen phosphate, 0.002 parts by mass of ethylenediamine tetra-acetic acid disodium salt (EDTA), 0.001 parts by mass of ferrous sulfate heptahydrate salt (Fe), and 1.5 parts by mass of sodium dodecylbenzenesulfonate (SDS) were added while they were stirring, oxygen was removed by carrying out a sufficient nitrogen substitution. After that, 100 parts by mass of butadiene (BD) was added to the system and the system was heated to 45° C. After 0.015 parts by mass of p-menthane hydroperoxide (PHP) and successively 0.04 parts by mass of sodium formaldehyde sulfoxylate (SFS) were added, polymerization was started. After 4 hours from the start of the polymerization, 0.01 parts by mass of PHP, 0.0015 parts by mass of EDTA, and 0.001 parts by mass of Fe were added. After polymerization for 10 hours, the remaining monomer was evaporated and removed under reduced pressure to complete polymerization to obtain a latex (R-1) containing polybutadiene rubber particles. The volume average particle diameter of the polybutadiene rubber particles contained in the obtained latex was 0.10 µm.

Production Example 1-2

Preparation of Styrene-Butadiene Rubber Latex (R-2)

A latex (R-2) containing styrene-butadiene rubber particles was obtained in the same manner as in Production Example 1, except that 75 parts by mass of BD and 25 parts by mass of styrene (ST) were added in the system in place of 100 parts by mass of BD. The volume average particle diameter of the styrene-butadiene rubber particles contained in the obtained latex was 0.10 µm.

Production Example 1-3

Preparation of Polyorganosiloxane Rubber Latex (R-3)

After a mixture of 200 parts by mass of deionized water, 1.0 part by mass of SDS, 1.0 part by mass of dodecylbenzenesulfonic acid, 97.5 parts by mass of hydroxy-terminated polydimethylsiloxane with an average molecular weight of 2000, and 2.5 parts by mass of γ-methacryloyloxypropyldimethoxysilane was mixed at 10000 rpm for 5 minutes by a homomixer, the mixture was passed through a high pressure homogenizer three times under a pressure of 500 bar to prepare a siloxane emulsion. This emulsion was quickly added to a glass reactor all together equipped with a thermometer, a stirrer, a reflux condenser, a nitrogen flow-inlet, and addition apparatus for monomers and auxiliary raw materials such as an emulsifier. While the system being stirred, a reaction was started at 30° C. After 6 hours, the system was cooled to 23° C. and left still for 20 hours, the pH of the system was turned back to 6.8 by sodium hydrogen carbonate to complete polymerization and a latex (R-3) containing polyorganosiloxane rubber particles was obtained. The volume average particle diameter of the polyorganosiloxane rubber particles contained in the obtained latex was 0.28 µm.

Production Example 1-4

Preparation of Acryl Rubber Latex (R-4)

After a glass reactor equipped with a thermometer, a stirrer, a reflux condenser, a nitrogen flow-inlet, and addition apparatus for monomers and an emulsifier was loaded with 180 parts by mass of deionized water, 0.002 parts by mass of EDTA, 0.001 parts by mass of Fe, 0.04 parts by mass of SFS, and 0.5 parts by mass of SDS, the mixture was heated to 45° C. while being stirred in a nitrogen stream. Next, a mixture of 98 parts by mass of n-butyl acrylate (BA), 2 parts by mass of allyl methacrylate (ALMA), and 0.02 parts by mass of cumene hydroperoxide (CHP) was dropwise added over 5 hours. Further, besides the addition of the above-mentioned monomer mixture, an aqueous solution of 5 wt. % concentration of SDS prepared from 1 part by mass of SDS was continuously added over 5 hours. Stirring was continued for 1 hour from finishing of the monomer mixture addition to complete polymerization and a latex (R-4H) containing acryl rubber particles was obtained. The volume average particle diameter of the acryl rubber particles contained in the obtained latex was 0.11 μm.

2. Preparation of Polymer Particles

Formation of Intermediate Layer and Shell Layer

Production Examples 2-1 to 2-4

Preparation of Core-Shell Polymer Latexes (L-1 to L-4)

A 3 L glass container was loaded with 440 parts by mass of deionized water and 450 parts by mass of each latex (R-1 to R-4) obtained in Production Examples 1-1 to 1-4 in terms of solid content and while the glass container being evacuated with nitrogen, the mixture was stirred at 50° C. for 30 minutes. After 0.012 parts by mass of EDTA, 0.006 parts by mass of Fe, and 0.24 parts by mass of SFS were added, 12 parts by mass of triallyl isocyanurate (TAIC) was added all together. Successively, 0.04 parts by mass of tert-butyl hydroperoxide (TBP) was added to start polymerization. After stirring was continued for 1 hour, a mixture of 78 parts by mass of ST, 36 parts by mass of acrylonitrile (AN), 36 parts by mass of glycidyl methacrylate (GMA), and 0.12 parts by mass of TBP was continuously added over 2 hours to carry out graft polymerization. After completion of the addition, stirring was carried out for another 2 hours to finish the reaction and latexes (L-1 to L-4) of core-shell polymers were obtained. The results of measurement of volume average particle diameters of the core-shell polymers contained in the obtained latexes are shown in Table 1.

Production Example 2-5

Preparation of Core-Shell Polymer Latex (L-5)

A 3 L glass container was loaded with 750 parts by mass (450 parts by mass in terms of natural rubber particles) of a natural rubber latex (SeLatex 3821: manufactured by SRI Hybrid Ltd.) and 1080 parts by mass of deionized water and while the glass container being evacuated with nitrogen, the mixture was stirred at 50° C. After 0.6 parts by mass of tetraethylenepentamine (TEPA) serving as a co-catalyst was added, 12 parts by mass of TAIC was added all together. Successively, 0.04 parts by mass of TBP was added to start polymerization. After stirring was continued for 1 hour, 12 parts by mass of SDS and 15 parts by mass of dodecylbenzenesulfonic acid (DBSA) as an acid for neutralization were added to adjust the pH of the system to be 7. Thereafter, 0.012 parts by mass of EDTA, 0.006 parts by mass of Fe, and 0.24 parts by mass of SFS were added, subsequently a mixture of 72 parts by mass of ST, 36 parts by mass of AN, 36 parts by mass of GMA, 6 parts by mass of ALMA, and 0.12 parts by mass of TBP was continuously added over 2 hours to carry out graft polymerization. After completion of the addition, stirring was carried out for another 2 hours to finish the reaction and a latex (L-5) of a core-shell polymer was obtained. The volume average particle diameter of the core-shell polymer contained in the obtained latex was 0.83 μm (see Table 1).

Production Examples 2-6 to 2-8

Preparation of Core-Shell Polymer Latexes (L-6 to L-8)

Latexes (L-6 to L-8) of core-shell polymers were obtained in the same manner as in Production Example 2-1, except that the amounts and the types of TAIC added in Production Example 2-1 were changed as shown in Table 1. The results of measurement of volume average particle diameters of the core-shell polymers contained in the obtained latexes are shown in Table 1.

Production Examples 2-9 to 2-13

Preparation of Core-Shell Polymer Latexes (L-9 to L-13)

Latexes (L-9 to L-13) of core-shell polymers were obtained in the same manner as in Production Examples 2-1 to 2-5, except that the step of adding TEPA (only in Production Example 2-5), TAIC and TBP and continuing the stirring for 1 hour in Production Examples 2-1 to 2-5 was omitted and graft polymerization was directly carried out after SFS addition. The results of measurement of volume average particle diameters of the core-shell polymers contained in the obtained latexes are shown in Table 2.

Production Examples 2-14 and 2-15

Preparation of Core-Shell Polymer Latexes (L-14 and L-15)

A 3 L glass container was loaded with 1575 parts by mass (510 parts by mass in terms of polybutadiene rubber particles) of the latex (R-1) obtained in Production Example 1-1 and 315 parts by mass of deionized water and while the glass container was evacuated with nitrogen, the mixture was stirred at 50° C. After 0.012 parts by mass of EDTA, 0.006 parts by mass of Fe, and 0.24 parts by mass of SFS were added, 12 parts by mass of triallyl isocyanurate (TAIC) was added all together. Successively, 0.04 parts by mass of tert-butyl hydroperoxide (TBP) was added to start polymerization. After stirring was continued for 1 hour, mixtures of 0.08 parts by mass of TBP and graft monomers having compositions shown in Table 3 (L-14: 42 parts by mass of ST, 12 parts by mass of methyl methacrylate (MMA), and 36 parts by mass of GMA, L-15: 42 parts by mass of ST, 21 parts by mass of MMA, 18 parts by mass of BA, and 9 parts by mass of ALMA) were continuously added over 1.2 hours to carry out graft polymerization. After completion of the addition, stirring was carried out for another 2 hours to finish the reaction and latexes (L-14 and 15) of core-shell polymers were obtained. The results of measurement of volume average particle diameters of the core-shell polymers contained in the obtained latexes are shown in Table 3.

Production Examples 2-16 and 2-17

Preparation of Core-Shell Polymer Latexes (L-16 and L-17)

Latexes (L-16 and L-17) of core-shell polymers were obtained in the same manner as in Production Examples 2-14 and 2-15, except that the step of adding TAIC and TBP and continuing the stirring for 1 hour in Production Examples 2-14 and 2-15 was omitted and graft polymerization was directly carried out after SFS addition. The results of measurement of volume average particle diameters of the core-shell polymers contained in the obtained latexes are shown in Table 4.

Production Examples 2-18

Preparation of Core-Shell Polymer Latex (L-18)

A 3 L glass container was loaded with 1480 parts by mass (480 parts by mass in terms of styrene-butadiene rubber particles) of the latex (R-2) obtained in Production Example 1-2 and 380 parts by mass of deionized water and while the glass container was evacuated with nitrogen, the mixture was stirred at 50° C. After 0.012 parts by mass of EDTA, 0.006 parts by mass of Fe, and 0.24 parts by mass of SFS were added, 12 parts by mass of triallyl isocyanurate (TAIC) was added all together. Successively, 0.04 parts by mass of tert-butyl hydroperoxide (TBP) was added to start polymerization. After stirring was continued for 1 hour, mixtures of 60 parts by mass of ST, 24 parts by mass of AN, 36 parts by mass of GMA, and 0.10 parts by mass of TBP were continuously added over 1.6 hours to carry out graft polymerization. After completion of the addition, stirring was carried out for another 2 hours to finish the reaction and a latex (L-18) of a core-shell polymer was obtained. The result of measurement of volume average particle diameter of the core-shell polymer contained in the obtained latex was 0.11 μm.

Production Examples 2-19

Preparation of core-shell polymer latex (L-19)

Latex (L-19) of core-shell polymer was obtained in the same manner as in Production Example 2-18, except that the step of adding TAIC and TBP and continuing the stirring for 1 hour in Production Example 2-18 was omitted and graft polymerization was directly carried out after SFS addition. The result of measurement of volume average particle diameter of the core-shell polymer contained in the obtained latex was 0.11 μm.

Production Examples 2-20

Preparation of Core-Shell Polymer Latex (L-20)

A 3 L glass container was loaded with 1530 parts by mass (498 parts by mass in terms of polyorganosiloxane rubber particles) of the latex (R-3) obtained in Production Example 1-3 and 348 parts by mass of deionized water and while the glass container was evacuated with nitrogen, the mixture was stirred at 50° C. After 0.012 parts by mass of EDTA, 0.006 parts by mass of Fe, and 0.24 parts by mass of SFS were added, 12 parts by mass of TAIC was added all together. Successively, 0.04 parts by mass of TBP was added to start polymerization. After stirring was continued for 1 hour, mixtures of 54 parts by mass of ST, 24 parts by mass of AN, 12 parts by mass of GMA, 12 parts by mass of ALMA, and 0.10 parts by mass of TBP were continuously added over 1.6 hours to carry out graft polymerization. After completion of the addition, stirring was carried out for another 2 hours to finish the reaction and a latex (L-20) of a core-shell polymer was obtained. The result of measurement of volume average particle diameter of the core-shell polymer contained in the obtained latex was 0.30 μm.

Production Examples 2-21

Preparation of Core-Shell Polymer Latex (L-21)

Latex (L-21) of core-shell polymer was obtained in the same manner as in Production Example 2-20, except that the step of adding TAIC and TBP and continuing the stirring for 1 hour in Production Example 2-20 was omitted and graft polymerization was directly carried out after SFS addition. The result of measurement of volume average particle diameter of the core-shell polymer contained in the obtained latex was 0.30 μm.

Examples 1 to 23 and Comparative Examples 1 to 15

Preparation of Liquid Resin Compositions M-1 to M-38

Into a 1 L mixing tank at 25° C., 126 g of methyl ethyl ketone (MEK) was introduced, successively 126 g of each of the aqueous latexes (L-1 to L-21) of core-shell polymers obtained in Production Examples 2-1 to 2-21 was added while being stirred. After uniformly mixing, 200 g of water was added at a feeding speed of 80 g/min. After the water feeding was completed, stirring was quickly stopped. At the time, a slurry liquid containing buoyant agglomerates and an aqueous phase containing a portion of the organic solvent were obtained. Next, 350 g of the aqueous phase was discharged through a discharge port located of lower of the tank, while leaving the agglomerates containing a portion of the aqueous phase. The obtained agglomerates were mixed uniformly with 90 g of MEK to obtain a dispersion in which the core-shell polymers were uniformly dispersed. After the resin components shown in Tables 1 to 6 in the amounts shown in Tables 1 to 6 (the amounts shown in Tables 1 to 6 are amounts in terms of the solid content) were mixed, MEK was distilled away under reduced pressure to obtain liquid resin compositions (M-1 to M-38) containing core-shell polymers. These liquid resin compositions were diluted with MEK and the average particle diameters of the core-shell polymers dispersed in the liquid resin compositions were measured by Microtrack UPA 150. The measurement results of the viscosity of the obtained liquid resin compositions are shown in Table 1 to Table 6.

TABLE 1

| | | Example 1 | Example 2 | Example 3 | Example 4 | Example 5 | Example 6 | Example 7 | Example 8 | Example 9 |
|---|---|---|---|---|---|---|---|---|---|---|
| | liquid resin composition | M-1 | M-2 | M-3 | M-4 | M-5 | M-6 | M-7 | M-8 | M-9 |
| polymer | latex | L-1 | L-2 | L-3 | L-4 | L-5 | L-6 | L-7 | L-8 | L-1 |
| particle | core layer (phr) | BD (75) | ST-BD (75) | poly organo siloxane (75) | acryl (75) | natural rubber (75) | | BD (75) | | |

TABLE 1-continued

|  |  | | | | | | | | | |
|---|---|---|---|---|---|---|---|---|---|---|
| intermediate layer (phr) | | TAIC (2) | | | | | TAIC (0.3) | TAIC (4) | ALMA (2) | TAIC (2) |
| shell layer (phr) | | ST (13)<br>AN (6)<br>GMA (6) | | | | ST (12)<br>AN (6)<br>GMA (6)<br>ALMA (1) | | ST (13)<br>AN (6)<br>GMA (6) | | |
| | volume average particle diameter in aqueous latex Mv (μm) | 0.11 | 0.11 | 0.31 | 0.12 | 0.83 | 0.11 | 0.11 | 0.11 | 0.11 |
| properties of liquid resin composition | resin component — type<br>amount (phr)<br>polymer particle (phr) | | | | | jER 828EL<br>75<br>25 | | | | 60<br>40 |
| | volume average particle diameter in liquid resin composition Mv (μm) | 0.18 | 0.19 | 0.36 | 0.21 | 0.86 | 0.20 | 0.18 | 0.19 | 0.18 |
| | number average particle diameter in liquid resin composition Mn (μm) | 0.14 | 0.13 | 0.23 | 0.16 | 0.31 | 0.14 | 0.14 | 0.14 | 0.14 |
| | dispersion degree (Mv/Mn) | 1.29 | 1.46 | 1.56 | 1.31 | 2.77 | 1.41 | 1.28 | 1.34 | 1.25 |
| | viscosity (Poise) | 48 | 65 | 34 | 55 | 96 | 58 | 38 | 50 | 218 | jER828EL: liquid bisphenol A type epoxy resin (available from Japan Epoxy Resins Co., Ltd.)

TABLE 2

| | | Comparative Example 1 | Comparative Example 2 | Comparative Example 3 | Comparative Example 4 | Comparative Example 5 | Comparative Example 6 |
|---|---|---|---|---|---|---|---|
| liquid resin composition | | M-10 | M-11 | M-12 | M-13 | M-14 | M-15 |
| polymer particle | latex | L-9 | L-10 | L-11 | L-12 | L-13 | L-9 |
| | core layer (phr) | BD (75) | ST-BD (75) | poly organo siloxane (75) | acryl (75) | natural rubber (75) | BD (75) |
| | intermediate layer (phr) | | | | — | | |
| | shell layer (phr) | | ST (13)<br>AN (6)<br>GMA (6) | | | ST (12)<br>AN (6)<br>GMA (6)<br>ALMA (1) | ST (13)<br>AN (6)<br>GMA (6) |
| | volume average particle diameter in aqueous latex Mv (μm) | 0.11 | 0.11 | 0.31 | 0.12 | 0.84 | 0.11 |
| properties of liquid resin composition | resin component — type<br>amount (phr)<br>polymer particle (phr) | | | | jER 828EL<br>75<br>25 | | 60<br>40 |
| | volume average particle diameter in liquid resin composition Mv (μm) | 0.20 | 0.21 | 0.38 | 0.22 | 0.90 | 0.19 |
| | number average particle diameter in liquid resin composition Mn (μm) | 0.14 | 0.15 | 0.23 | 0.16 | 0.32 | 0.14 |
| | dispersion degree (Mv/Mn) | 1.43 | 1.46 | 1.63 | 1.37 | 2.80 | 1.42 |
| | viscosity (Poise) | 154 | 168 | 143 | 228 | 322 | 1778 |

TABLE 3

| | | Example 10 | Example 11 | Example 12 | Example 13 | Example 14 | Example 15 | Example 16 | Example 17 |
|---|---|---|---|---|---|---|---|---|---|
| liquid resin composition | | M-16 | M-17 | M-18 | M-19 | M-20 | M-21 | M-22 | M-23 |
| polymer particle | latex | | | L-14 | | | | L-15 | |
| | core layer (phr) | | | BD (85) | | | | BD (85) | |
| | intermediate layer (phr) | | | TAIC (2) | | | | TAIC (2) | |
| | shell layer (phr) | | | ST (7)<br>MMA (2)<br>GMA (6) | | | | ST (7)<br>MMA (3.5)<br>BA (3)<br>ALMA (1.5) | |
| | volume average particle diameter in aqueous latex Mv (μm) | | | 0.11 | | | | 0.11 | |

TABLE 3-continued

|  |  |  | Example 10 | Example 11 | Example 12 | Example 13 | Example 14 | Example 15 | Example 16 | Example 17 |
|---|---|---|---|---|---|---|---|---|---|---|
| properties of liquid resin composition | resin component | type | CEL2021P | jER828EL/ CEL2021P | ← | OXT-101 | jER828EL/ OXT-101 | ← | Ebecryl 3700 | ← |
|  |  | amount (phr) | 75 | 37.5/37.5 | 30/30 | 75 | 37.5/37.5 | 30/30 | 75 | 60 |
|  | polymer particle (phr) |  | 25 | ← | 40 | 25 | ← | 40 | 25 | 40 |
|  | volume average particle diameter in liquid resin composition Mv (μm) |  | 0.20 | 0.19 | 0.21 | 0.21 | 0.20 | 0.20 | 0.18 | 0.19 |
|  | number average particle diameter in liquid resin composition Mn (μm) |  | 0.14 | 0.14 | 0.15 | 0.15 | 0.14 | 0.14 | 0.14 | 0.14 |
|  | dispersion degree (Mv/Mn) |  | 1.49 | 1.39 | 1.38 | 1.46 | 1.41 | 1.42 | 1.33 | 1.39 |
|  | viscosity (Poise) |  | 48 | 58 | 198 | 27 | 40 | 108 | 178 | 485 |

CEL2021P: alicyclic epoxy resin (available from DAICEL CHEMICAL INDUSTRIES, LTD.)
OXT-101: oxetane resin (available from TOAGOSEI CO., LTD.)
Ebecryl 3700: epoxyacrylate resin (available from DAICEL-CYTEC Company, Ltd.)

TABLE 4

|  |  |  | Comparative Example 7 | Comparative Example 8 | Comparative Example 9 | Comparative Example 10 | Comparative Example 11 |
|---|---|---|---|---|---|---|---|
| liquid resin composition |  |  | M-24 | M-25 | M-26 | M-27 | M-28 |
| polymer particle | latex |  |  | L-16 |  |  | L-17 |
|  | core layer (phr) |  |  | BD (85) |  |  | BD (85) |
|  | intermediate layer (phr) |  |  | — |  |  | — |
|  | shell layer (phr) |  |  | ST (7) MMA (2) GMA (6) |  |  | ST (7) MMA (3.5) BA (3) ALMA (1.5) |
|  | volume average particle diameter in aqueous latex Mv (μm) |  |  | 0.11 |  |  | 0.11 |
| properties of liquid resin composition | resin component | type | CEL2021P | jER 828EL/ CEL2021P | OXT-101 | jER 828EL/ OXT-101 | Ebecryl 3700 |
|  |  | amount (phr) | 75 | 37.5/37.5 | 75 | 37.5/37.5 | 75 |
|  | polymer particle (phr) |  |  |  | 25 |  |  |
|  | volume average particle diameter in liquid resin composition Mv (μm) |  | 0.21 | 0.20 | 0.20 | 0.21 | 0.20 |
|  | number average particle diameter in liquid resin composition Mn (μm) |  | 0.14 | 0.14 | 0.13 | 0.14 | 0.14 |
|  | dispersion degree (Mv/Mn) |  | 1.53 | 1.42 | 1.48 | 1.51 | 1.39 |
|  | viscosity (Poise) |  | 348 | 164 | 287 | 182 | 762 |

TABLE 5

|  |  |  | Example 18 | Example 19 | Example 20 | Example 21 | Comparative Example 12 | Comparative Example 13 |
|---|---|---|---|---|---|---|---|---|
| liquid resin composition |  |  | M-29 | M-30 | M-31 | M-32 | M-33 | M-34 |
| polymer particle | latex |  |  | L-18 |  |  | L-19 |  |
|  | core layer (phr) |  |  | ST-BD (80) |  |  | ST-BD (80) |  |
|  | intermediate layer (phr) |  |  | TAIC (2) |  |  | — |  |
|  | shell layer (phr) |  |  | ST (10) AN (4) GMA (6) |  |  | ST (10) AN (4) GMA (6) |  |
|  | volume average particle diameter in aqueous latex Mv (μm) |  |  | 0.11 |  |  | 0.11 |  |
| properties of liquid resin | resin component | type | DEN438L |  | DER592A80 |  | DEN438L | DER592A80 |
|  |  | amount (phr) | 52.5 | 60 | 52.5 (solid content) | 60 (solid content) | 52.5 (solid content) |  |

TABLE 5-continued

|  |  | Example 18 | Example 19 | Example 20 | Example 21 | Comparative Example 12 | Comparative Example 13 |
|---|---|---|---|---|---|---|---|
| composition | solvent (phr) | MEK (30) | MEK (20) | MEK (30) | MEK (20) | MEK (30) | MEK (30) |
|  | polymer particle (phr) | 17.5 | 20 | 17.5 | 20 | 17.5 | 17.5 |
|  | volume average particle diameter in liquid resin composition Mv (μm) | 0.20 | 0.20 | 0.21 | 0.20 | 0.20 | 0.19 |
|  | number average particle diameter in liquid resin composition Mn (μm) | 0.14 | 0.14 | 0.15 | 0.14 | 0.14 | 0.14 |
|  | dispersion degree (Mv/Mn) | 1.38 | 1.48 | 1.43 | 1.45 | 1.46 | 1.43 |
|  | viscosity (Poise) | 28 | 65 | 17 | 48 | 58 | 45 |

DEN438L: phenol novolac type epoxy resin (available from Dow Chemical Company)
DER592A80: a solution of a brominated epoxy resin in 80% acetone (available from Dow Chemical Company)

TABLE 6

|  |  | Example 22 | Example 23 | Comparative Example 14 | Comparative Example 15 |
|---|---|---|---|---|---|
|  | liquid resin composition | M-35 | M-36 | M-37 | M-38 |
| polymer particle | latex | L-20 | | L-21 | |
|  | core layer (phr) | polyorganosiloxane (83) | | polyorganosiloxane (83) | |
|  | intermediate layer (phr) | TAIC (2) | | — | |
|  | shell layer (phr) | ST (9) | | ST (9) | |
|  |  | AN (4) | | AN (4) | |
|  |  | GMA (2) | | GMA (2) | |
|  |  | ALMA (2) | | ALMA (2) | |
|  | volume average particle diameter in aqueous latex Mv (μm) | 0.30 | | 0.30 | |
| properties of liquid resin composition | resin type component | Matrimid 5292B | TAIC | Matrimid 5292B | TAIC |
|  | amount (phr) | 75 | | 75 | |
|  | polymer particle (phr) | 25 | | 25 | |
|  | volume average particle diameter in liquid resin composition Mv (μm) | 0.34 | 0.20 | 0.35 | 0.19 |
|  | number average particle diameter in liquid resin composition Mn (μm) | 0.23 | 0.14 | 0.22 | 0.14 |
|  | dispersion degree (Mv/Mn) | 1.48 | 1.48 | 1.59 | 1.43 |
|  | viscosity (Poise) | 44 | 16 | 155 | 86 |

Matrimid5292B: o,o'-diallylbisphenol-A (B component of bismaleimide type resin) (available from Huntsman Advanced Materials)

From the results of Examples 1 to 23 and Comparative Examples 1 to 15, it can be understood that the liquid resin compositions composed of polymer particles having an intermediate layer had lower viscosities than those of liquid resin compositions composed of polymer particles having no intermediate layer.

INDUSTRIAL APPLICABILITY

The polymer particles to be used in the invention can suppress the viscosity of a liquid resin composition containing the polymer particles. Therefore, the liquid resin composition of the invention can be suitably used for obtaining a cured product suitable for various applications.

The invention claimed is:
1. A liquid resin composition comprising:
a resin component (A) selected from the group consisting of liquid thermosetting resins or photo curable resins, resin solutions of solid thermosetting resins or photo curable resins dissolved in a solvent, and liquid organic compounds capable of forming a polymer chain with a thermosetting resin or a photo curable resin; and
polymer particles (B) each having an elastic core layer, an intermediate layer formed with only a monomer having two or more polymerizable double bonds and coated on the core layer, and a shell layer coated on the intermediate layer;
wherein the polymer particles (B) are dispersed at a ratio of their volume average particle diameter (Mv) to their number average particle diameter (Mn) of 3 or lower,
the monomer having two or more polymerizable double bonds is at least one selected from the group consisting of (meth)acrylate polyfunctional monomers, isocyanuric acid derivatives, aromatic vinyl polyfunctional monomers, and aromatic polycarboxylic acid esters having two or more polymerizable double bonds, and
the intermediate layer is contained at an amount of not smaller than 0.2% by mass and not larger than 7% by mass in 100% mass of the polymer particles (B).

2. The liquid resin composition according to claim 1, wherein the shell layer contains at least one kind of a component having an organic group selected from a hydroxyl group, a carbon-carbon double bond, and an epoxy group.

3. The liquid resin composition according to claim 1, wherein the liquid thermosetting resin or photo curable resin is a resin selected from epoxy resins, oxetane resins, and acrylate resins.

4. The liquid resin composition according to claim 1, wherein the liquid organic compound is an aromatic di(meth) allyl compound.

5. The liquid resin composition according to claim 1, which is prepared by a process comprising:
   a first step of mixing an aqueous latex containing the polymer particles (B) with an organic solvent having a solubility in water of not lower than 5% by mass and not higher than 40% by mass at 20° C., and then further mixing the obtained mixture with an excess amount of water to aggregate the polymer particles (B);
   a second step of separating and recovering the aggregated polymer particles (B) from a liquid phase, and then mixing again the agglomerated polymer particles (B) with an organic solvent to obtain an organic solvent solution of the polymer particles (B); and
   a third step of mixing the organic solvent solution with the resin component (A), and then removing the organic solvent by distillation.

6. The liquid resin composition according to claim 5, wherein the method further comprises, between the first step and the second step, at least one operation of separating and recovering the aggregated polymer particles (B) from a liquid phase, mixing again the aggregated polymer particles (B) with an organic solvent having a solubility in water of not lower than 5% by mass and not higher than 40% by mass at 20° C., and then further mixing with an excess amount of water to aggregate the polymer particles (B).

7. A liquid resin composition comprising a mixture of two or more kinds of the liquid resin compositions according to claim 1.

8. A cured product obtained by curing the liquid resin composition according to claim 1.

9. A cured product obtained by curing the liquid resin composition according to claim 7.

* * * * *